(12) United States Patent
Nandy (10) Patent No.: US 9,712,915 B2
(45) Date of Patent: Jul. 18, 2017

(54) REFERENCE MICROPHONE FOR NON-LINEAR AND TIME VARIANT ECHO CANCELLATION

(71) Applicant: Knowles Electronics, LLC, Itasca, IL (US)

(72) Inventor: Dibyendu Nandy, Naperville, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/944,474

(22) Filed: Nov. 18, 2015

(65) Prior Publication Data

US 2016/0150337 A1 May 26, 2016

Related U.S. Application Data

(60) Provisional application No. 62/084,221, filed on Nov. 25, 2014.

(51) Int. Cl.
*H04R 3/02* (2006.01)
*G10L 21/0208* (2013.01)
*H04M 9/08* (2006.01)

(52) U.S. Cl.
CPC ............ *H04R 3/02* (2013.01); *G10L 21/0208* (2013.01); *H04M 9/082* (2013.01);
(Continued)

(58) Field of Classification Search
CPC .. H04R 3/02; H04R 2410/05; H04R 2499/11; G10L 21/02; H04M 9/082
See application file for complete search history.

(56) References Cited

U.S. PATENT DOCUMENTS 5,003,606 A * 3/1991 Bordewijk ........... H04R 25/453
381/318
5,561,737 A * 10/1996 Bowen .................... H04M 3/56
379/206.01

(Continued)

FOREIGN PATENT DOCUMENTS

JP 2010166406 7/2010

OTHER PUBLICATIONS

International Search Report and Written Opinion for PCT/US2015/061569 dated Mar. 22, 2016 (10 pages).
(Continued)

*Primary Examiner* — Ping Lee
(74) *Attorney, Agent, or Firm* — Foley & Lardner LLP (57) ABSTRACT

A far end signal from a far end user and broadcasting the far end signal at a loudspeaker is received. A signal for use in an echo transfer function is determined, and the signal selected from between: the far end signal or an echo reference signal received from a near field microphone disposed in close proximity to the speaker. The near field microphone sensing the far end signal that is broadcast from the speaker while sensing the near-end speech and ambient noise at insignificant energy levels compared to the speaker signal. An echo transfer function is determined based at least in part upon the selected signal, and the echo transfer function represents characteristics of an acoustic path between the loudspeaker and a far field microphone that is disposed at a greater distance from the speaker than the near field microphone. An estimated echo is determined based at least in part upon the echo transfer function. The estimated echo is subtracted from a signal received from the far field microphone, the subtracting effective to cancel an echo present in the signal received from the far end microphone.

24 Claims, 5 Drawing Sheets

(52) U.S. Cl.
CPC .... *G10L 2021/02082* (2013.01); *H04R 2410/05* (2013.01); *H04R 2499/11* (2013.01)

(56) References Cited

U.S. PATENT DOCUMENTS

| | | | |
|---|---|---|---|
| 5,822,598 A | 10/1998 | Lam | |
| 6,070,140 A | 5/2000 | Tran | |
| 6,154,721 A | 11/2000 | Sonnic | |
| 6,249,757 B1 | 6/2001 | Cason | |
| 6,397,186 B1 | 5/2002 | Bush et al. | |
| 6,756,700 B2 | 6/2004 | Zeng | |
| 7,415,416 B2 | 8/2008 | Rees | |
| 7,508,948 B2 | 3/2009 | Klein | |
| 7,774,204 B2 | 8/2010 | Mozer et al. | |
| 7,957,972 B2 | 6/2011 | Huang et al. | |
| 8,032,364 B1 | 10/2011 | Watts | |
| 8,143,620 B1 | 3/2012 | Malinowski | |
| 8,189,766 B1 | 5/2012 | Klein | |
| 8,194,880 B2 | 6/2012 | Avendano | |
| 8,194,882 B2 | 6/2012 | Every | |
| 8,204,252 B1 | 6/2012 | Avendano | |
| 8,204,253 B1 | 6/2012 | Solbach | |
| 8,259,926 B1 | 9/2012 | Avendano | |
| 8,275,148 B2 | 9/2012 | Li et al. | |
| 8,355,511 B2 | 1/2013 | Klein | |
| 8,447,045 B1 | 5/2013 | Laroche | |
| 8,447,596 B2 | 5/2013 | Avendano | |
| 8,472,616 B1 | 6/2013 | Jiang | |
| 8,473,285 B2 | 6/2013 | Every | |
| 8,473,287 B2 | 6/2013 | Every | |
| 8,488,805 B1 | 7/2013 | Santos | |
| 8,526,628 B1 | 9/2013 | Massie | |
| 8,538,035 B2 | 9/2013 | Every | |
| 8,606,249 B1 | 12/2013 | Goodwin | |
| 8,606,571 B1 | 12/2013 | Every | |
| 8,611,551 B1 | 12/2013 | Massie | |
| 8,611,552 B1 | 12/2013 | Murgia | |
| 8,615,392 B1 | 12/2013 | Goodwin | |
| 8,666,751 B2 | 3/2014 | Murthi et al. | |
| 8,682,006 B1 | 3/2014 | Laroche | |
| 8,737,188 B1 | 5/2014 | Murgia | |
| 8,750,526 B1 | 6/2014 | Santos | |
| 8,761,410 B1 | 6/2014 | Avendano | |
| 8,774,423 B1 | 7/2014 | Solbach | |
| 8,781,137 B1 | 7/2014 | Goodwin | |
| 8,848,935 B1 | 9/2014 | Massie | |
| 8,886,525 B2 | 11/2014 | Klein | |
| 8,949,120 B1 | 2/2015 | Every | |
| 8,958,572 B1 | 2/2015 | Solbach | |
| 8,972,252 B2 | 3/2015 | Hung et al. | |
| 8,996,381 B2 | 3/2015 | Mozer et al. | |
| 9,007,416 B1 | 4/2015 | Murgia | |
| 9,008,329 B1 | 4/2015 | Mandel | |
| 9,043,211 B2 | 5/2015 | Haiut et al. | |
| 9,049,282 B1 | 6/2015 | Murgia | |
| 9,112,984 B2 | 8/2015 | Sejnoha et al. | |
| 9,143,857 B2 | 9/2015 | Every | |
| 9,185,487 B2 | 11/2015 | Solbach | |
| 9,197,974 B1 | 11/2015 | Clark | |
| 2005/0285935 A1 | 12/2005 | Hodges | |
| 2006/0074658 A1 | 4/2006 | Chadha | |
| 2011/0194685 A1* | 8/2011 | van de Laar | H04M 9/082 379/406.01 |
| 2012/0232896 A1 | 9/2012 | Taleb et al. | |
| 2012/0310641 A1 | 12/2012 | Niemisto et al. | |
| 2013/0003960 A1* | 1/2013 | Sollenberger | H04M 9/082 379/406.01 |
| 2013/0142355 A1 | 6/2013 | Isaac | |
| 2013/0223635 A1 | 8/2013 | Singer et al. | |
| 2013/0231925 A1 | 9/2013 | Avendano | |
| 2013/0322643 A1 | 12/2013 | Every | |
| 2014/0105411 A1 | 4/2014 | Santos | |
| 2014/0112496 A1 | 4/2014 | Murgia | |
| 2014/0163978 A1 | 6/2014 | Basye et al. | |
| 2014/0205107 A1 | 7/2014 | Murgia | |
| 2014/0241702 A1 | 8/2014 | Solbach | |
| 2014/0244269 A1 | 8/2014 | Tokutake | |
| 2014/0257821 A1 | 9/2014 | Adams et al. | |
| 2014/0274203 A1 | 9/2014 | Ganong et al. | |
| 2014/0278435 A1 | 9/2014 | Ganong et al. | |
| 2014/0281628 A1 | 9/2014 | Nigam et al. | |
| 2014/0335917 A1 | 11/2014 | Tetelbaum | |
| 2014/0343949 A1 | 11/2014 | Huang et al. | |
| 2015/0106085 A1 | 4/2015 | Lindahl | |
| 2015/0112690 A1 | 4/2015 | Guha et al. | |
| 2015/0134331 A1 | 5/2015 | Millet et al. | |
| 2016/0027451 A1 | 1/2016 | Solbach | |
| 2016/0063997 A1 | 3/2016 | Nemala | |
| 2016/0064009 A1 | 3/2016 | Every | |
| 2016/0066087 A1 | 3/2016 | Solbach | |
| 2016/0066089 A1 | 3/2016 | Klein | |
| 2016/0205263 A1* | 7/2016 | Liu | H04M 9/082 455/570 |

OTHER PUBLICATIONS

Klippel et al., "Loudspeaker Testing at the Production Line," http://www.klippel.de/fileadmin/klippel/Bilder/Know-How/Literature/Papers/Loudspeaker_Testing_at_the_production_line_06.pdf dated May 1, 2006 (13 pages).

* cited by examiner

REFERENCE MICROPHONE FOR NON-LINEAR AND TIME VARIANT ECHO CANCELLATION

CROSS-REFERENCE TO RELATED APPLICATION

This patent claims benefit under 35 U.S.C. §119(e) to U.S. Provisional Application No. 62/084,221 entitled "Reference Microphone for Non-linear and time variant echo cancellation" filed Nov. 25, 2014, the content of which is incorporated herein by reference in its entirety.

TECHNICAL FIELD

This application relates to acoustic echo canceling approaches, for example, those used in mobile phones.

BACKGROUND OF THE INVENTION

In a two-way telecommunication system, acoustic echo is the result of a signal output by the loudspeaker being captured by the microphone on the same device, typically called the near-end device. The result of this capture is that the user of the other side of the conversation, the far-end user, hears their own voice as an echo, after a telecommunication lag. Echo is provably detrimental to having a natural conversation and approaches to eliminate echo are needed for speakerphone conversations.

Speaker-phone devices sometimes use a full-duplex acoustic echo cancellation (AEC) algorithm to cancel the echoed speech and to minimize the impact conversational quality. The AEC algorithm works best when a purely linear dependency can be established between the signal sent to the loudspeaker and the signal captured by the microphone.

In current-day mobile devices, the drive towards portability and slimmer industrial design has led to smaller volumes being available inside these devices. Acoustic performance suffers from this constraint in available volume. Smaller and thinner loudspeakers need to be used for thin elegant designs. As a result, lower volumes of air can be moved leading to a reduction in sound pressure levels (SPLs), especially at lower frequencies. When original equipment manufacturers (OEMs) design to specification of a small speaker, then the resultant speakers are not able to achieve desired SPLs. Audio system engineers may over-drive the loudspeakers and power amplifiers to get the desired SPL. However, the constraints on loudspeaker size often result in non-linear output.

In general, loudspeaker vibrations behave differently at small and high amplitudes. The dependency on the amplitude is an indication of nonlinearities inherent in the system. Overdriving speakers also causes non-linear distortion by excessive excursion of the loudspeaker diaphragm, a result of soft clipping. This secondary nonlinear effect is the generation of additional spectral components which are not in the exciting stimulus. They are usually integer multiples of the applied fundamentals as harmonics or inter-modulation distortion between multiple fundamentals. The creation of harmonics is also exploited to overdrive small speakers, because harmonics of low frequency fundamentals can psycho-acoustically fill in for the low frequency loss making the lows end of the audio spectrum sound fuller than they are.

One factor that affects non-linear behavior in small speakers is the Magnetic Force factor $Bl(x)$. The magnetic force factor is a function of displacement as the field is not uniform. This has more impact in a smaller speaker. Another factor is Compliance $Cms(x)$ or inversely Stiffness of Suspension $Kms(x)$. This is the restoring force of the suspension increases as a function of the distance. Still another factor is the Mechanical Resistance $Rms(v)$ and this factor depends on the velocity of the coil. The Mechanical Resistance increases with increasing velocity in either direction.

The major cause of non-linearities in the echo-path of a speakerphone application is usually the speaker. All of these factors influence the force applied to the diaphragm, which further affects the displacement and velocity of the voice coil. This is a non-linear feedback loop with interactions between these factors. $Bl(x)$ and $Kms(x)$ generate DC components while $Rms(v)$ causes compression of the fundamental at resonance. These affect Total Harmonic Distortion (THD) and Inter Modulation Distortion (IMD) via feedback. The dominant non-linearities in loudspeakers can have significant impact on the output signal.

Overdriving speakers beyond specifications can also cause loudspeakers to fail because excessive excursion can cause the diaphragm to blow and because excess heat in the voice coil of the speaker can also cause its failure. Electronic feedback compensation may be used for speaker protection. Speaker protection technology measures current and voltage across the voice coil to estimate the temperature and excursion and adaptively limit these below maximum levels for highest possible SPLs and better audibility. This increases life of the loudspeaker while extracting maximum performance.

Speaker protection technology use adaptive algorithms to manage the output signal dynamics, in order to constrain excursion, limit temperature and minimize THD while maximizing the output power. The loudspeaker output varies constantly in time and frequency compared to the signal that the AEC uses. Thus, loudspeaker signal output levels can be temporally highly de-correlated from the far-end signal that an AEC algorithm normally uses as the echo reference signal, i.e. it is no longer a time-invariant even in a quasi-stationary sense.

Small speakers are used in mobile audio because of: constraints on dimensions driven by marketing and industrial design requirements; small space for speaker acoustics (including back volume); thin devices for mobility and convenience of handling; economic decisions by manufacturers; and the control of the Bill of Materials and costs in a highly competitive market.

Small speakers are often overdriven because of engineering and marketing decisions. These speakers need to meet target SPL for use case and induce harmonic distortion of low frequency fundamentals to enhance bass perception especially as low frequency is attenuated in smaller speakers.

The consequence of speaker non-linearities and speaker protection algorithms for AEC algorithms is that the linear time-invariant relationship between the echo reference signal and actual loudspeaker output is not maintained. This can result in poor AEC performance.

There are several problems with such non-linear system identification and previous algorithms were not good enough to match the performance of an AEC under linear conditions. The computational complexities of non-linear AEC (NLAEC) algorithms are also significantly more than linear AEC algorithms. Additionally the need to over-drive small speakers for deriving sufficient output for such use cases has also led to the development of time varying speaker protection algorithms, which dynamically adjust the drive power of the speaker depending on real-time performance parameters derived from the speakers. This can result in reduction of non-linearity but leads a speaker output system that is time varying. This also causes problems on convergence of AEC algorithms, which typically work of reference signals derived before the speaker protection algorithm.

All of these problems have resulted in some user dissatisfaction with previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide acoustic echo canceling in electronic devices such as telephones and mobile wireless devices (e.g., mobile or smart phones). In one specific example, a mobile phone may be used as a speakerphone, and the signal from loudspeaker is captured by the microphone on the device and is echoed back to the person who uttered the original speech. In specific consumer devices such as mobile smartphones, the loudspeaker and often the power amplifier may be often driven out of its linear range of operation.

Under such circumstances, modifications are made to the linear acoustic echo cancellation (AEC) algorithm to attempt to identify and cancel the non-linear components of the echo. The present approaches address the issue of acoustic echo cancellation under non-linear and time-varying conditions and provide for improved performance and reduced algorithm complexity of the AEC to those operating on linear time-invariant systems.

The approaches presented herein relate to voice telephony and, more specifically, acoustic echo canceling approaches used in mobile phones. However, it will be appreciated that the concepts presented herein may be used effectively in acoustic echo cancellation setups where-ever the signal output from a speaker is no longer correlated in a linear and time-invariant with the signal that is played out by a playback application.

In many of these embodiments, a far end signal is received from a far end user and the far end signal is broadcast at a loudspeaker. A signal for use in estimating an echo transfer function is determined and the signal selected from between: the far end signal or an echo reference signal received from a near field microphone disposed in close proximity to the speaker. The near field microphone senses the far end signal that is broadcast from the speaker. An echo transfer function is determined based at least in part upon the selected signal, and the echo transfer function represents characteristics of an acoustic path between the loudspeaker and a far field microphone that is disposed at a greater distance from the speaker than the near field microphone. An estimated echo is determined based at least in part upon the echo transfer function. The estimated echo is subtracted from a signal received from the far field microphone, and the subtracting is effective to cancel an echo present in the signal received from the far end microphone.

In some aspects, the near field microphone is a differential microphone. In other aspects, the far end signal is amplified by a power amplifier.

In some examples, the speaker and near field microphone are disposed so as to be approximately within 5 mm of each other. In other examples, the near field microphone, far field microphone, and speaker are disposed at a single platform. In other examples, the near field microphone and speaker are disposed at a single platform and the far-field microphone disposed in another platform in the same acoustic environment.

In some aspects, the differential pressure level due to the speaker output of the far end signal does not overload the differential microphone, despite the proximity of the differential microphone to the speaker. In other aspects, the signal picked up at the differential microphone is the speaker output signal including all speaker non-linearity effects, and has insignificant energy due to the near-end speech signal and ambient noise, allowing the echo transfer function estimation process to be a linear process.

In some examples, differential pressure level due to the near-end speech signal and ambient noise is insignificant at the differential microphone due to the distances of the near-end and noise sources from the differential microphone. In other aspects, the signal picked up the differential microphone is the speaker output signal including all speaker non-linearity effects, and has insignificant energy due to the near-end speech signal and ambient noise, thus permitting the echo transfer function estimation process to be a linear process.

In some examples, the echo transfer estimate from the linear echo transfer function estimation is used to estimate a non-linear echo path and subtract the non-linear echo successfully from the microphone signal captured by the far-field voice microphone. In some examples, the single platform is at a cellular phone, laptop, or tablet, home automation device or other near-end speech communication device or device capable of audio playback and responsive to speech input. Other examples are possible.

In others of these examples, an apparatus includes a near field microphone for receiving sound from a speaker and producing an echo reference signal; and a far field microphone for receiving sound and from the speaker. The near field microphone and speaker are disposed in close proximity. The apparatus includes an echo reference control module configured to adaptively and dynamically determine an echo estimation signal to estimate the echo transfer function, the signal being selected from between: an echo reference signal received from the near field microphone and a far-end signal from a far end user or a combination of the two signals. The apparatus also includes an adaptation module that is configured to determine an echo transfer function based at least in part upon the selected echo estimation signal, and the adaptation module id further configured to determine an estimated echo based at least in part upon the echo transfer function. The apparatus also includes a summer that subtracts the estimated echo from the signal produced by the far field microphone to produce an echo canceled signal.

Figure 1:
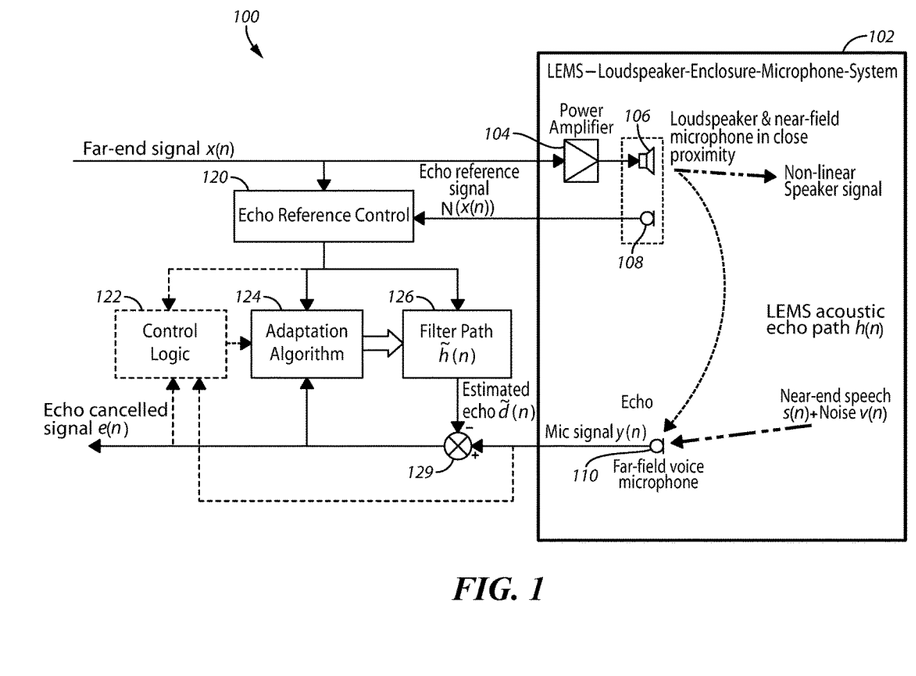
FIG. 1 comprises a block diagram of a microphone system according to various embodiments of the present invention.

Referring now to FIG. 1, one example of an echo cancellation system 100 is described. The system 100 includes a loudspeaker-enclosure-microphone-system (LEMS) 102. The LEMS 102 includes a power amplifier 104 (to amplify incoming signals), a speaker 106 (to present the signals to a user), a near field microphone 108 (in close proximity to the speaker 106 used as a close proximity noise cancelling microphone arrangement), and a far-field microphone 110. The speaker 106 may be any type of speaker or receiver that converts electrical signals into sound energy. In one example, the speaker 106 is a loud speaker. The microphone 108 in one example is a differential microphone as described below.

The system 100 also includes an echo reference control module 120, control logic 122, an adaption algorithm 124, and a filter path 126. The function of the echo reference control module 120 is to adaptively determine the signal to use for determining the echo transfer function, the echo reference from the microphone 108 $N\{x(n)\}$ or the far-end signal $x(n)$. It may do so by determining the amount of non-linearity in the speaker by comparing the echo-reference signal with the echo signal picked up by microphone 108. The function of the control logic 122 is to work in conjunction with the echo reference control module 120 to manage the adaptation algorithm 124, such that the appropriate inputs are used in the process. The function of the adaption algorithm 124 is to estimate the echo transfer function. It can be one of several standard and proven linear acoustic echo cancellation algorithms. The function of the filter path 126 is to model the acoustic echo path and thus replicate the real echo that may be cancelled in the acoustic echo canceller.

As shown in FIG. 1, the close proximity noise cancelling microphone arrangement 108 is placed adjacent to the speaker 106 in a compact mobile device. By "close proximity" it is meant distances of less than approximately 5 mm. Other distances are possible. The close proximity of the speaker 106 permits the microphone 108 to pick up reference echo signals while being immune to signals from other acoustic sources.

The microphone 108 is used as a far-end echo reference microphone. This allows echo reference to be linear with respect to the main microphone echo signal from the microphone 110 because all the nonlinearities in the speaker 106 are already accounted for. In combination with the original far-end reference signal (provided internally through, for example, software as in currently available implementations of echo-cancellers), such a signal source leads to excellent AEC performance even in highly non-linearly driven loudspeaker systems, a key point of algorithm complexity and perhaps failure in mobile systems. The far-end reference will provide a far-end voice activity detection trigger for the echo reference picked up by the dual-port mic. This in turn provides the reference signal provided to a suitable linear acoustic echo canceller algorithm as given by equations given below. Optimized algorithms such as NLMS, FD-NLMS, MDF or similar algorithms may be used instead as the linear conditions hold.

In the two way telecommunication system of FIG. 1, acoustic echo is the result of a signal output by the loudspeaker 106 being captured by the microphone 110 on the same device, typically called the near-end. The result of this capture is that the user of the other side of the conversation, the far-end, hears their own voice as an echo, after a telecommunication lag. Echo is provably detrimental to having a natural conversation and means to eliminate echo are needed for speakerphone conversations. In one aspect, the system 100 uses a full-duplex acoustic echo cancellation (AEC) algorithm (implemented via adaptation algorithm 124) to cancel the echoed speech, to minimize the impact conversational quality. The AEC algorithm works best when a purely linear dependency can be established between the signal sent to the loudspeaker 106 and the signal captured by the microphone 110.

As shown in FIG. 1, the signal 132 from the far-end is broadcast acoustically by the loudspeaker 106 into the room, in which the user listens to the speakerphone device. Furthermore, the microphone 110 captures the speech of the user (near-end speech) along with the echo of the broadcast loudspeaker signal and any background noise. The loudspeaker 106, the room (enclosure) and the microphones 108 and 110 together comprise the LEMS 102. Assuming that the LEMS 102 is linear, the echo can be modeled as the convolution of the far-end signal $x(n)$ and the LEMS acoustic response $h(n)$, i.e.

$$d(n)=h(n)*x(n) \quad (1)$$

Using a linear model of the loudspeaker 106 and microphone 110, the acoustic path between the loudspeaker 106 and the microphone 110 and the associated linear gains are lumped into the room's acoustic response or echo path transfer function. Thus the LEMS acoustic response $h(n)$ may be modeled as a finite impulse response (FIR) filter $h(n)$. The echo is then function of the far-end signal $x(n)$ (represented as a vector).

$$d(n)=h(n)^T x(n) \quad (2)$$

The goal of the AEC algorithm 124 is to remove the echo signal $d(n)$ from the microphone signal so that it is imperceptible to the user at the far-end. This must be done without distorting the near-end speech signal $s(n)$. The general approach to AEC algorithm 124 is to adaptively estimate the echo path from the loudspeaker to the microphone. This estimate is then applied to the far-end signal to recreate echo so that it may be subtracted from the mic signal $s(n)$ and a summer 129. This is complicated by the presence of ambient noise $v(n)$. The microphone signal is the sum of the echo, near end signal and noise.

$$y(n)=d(n)+s(n)+v(n)=h(n)^T x(n)+s(n)+v(n) \quad (3)$$

The echo canceller is driven to converge to a finite impulse response transversal filter estimate $\hat{h}(n)$ of the echo path through an adaptive algorithm. The estimated echo $\tilde{d}(n)$ may be written as a function of the modeled echo path and the loudspeaker signal.

$$\tilde{d}(n)=\hat{h}(n)^T x(n) \quad (4)$$

The signal e(n) after echo cancellation is defined as an error signal, the difference between the mic signal and the estimated echo:

$$e(n)=y(n)-\tilde{d}(n)=y(n)-\tilde{h}(n)^T x(n) \qquad (5)$$

The problem can be solved by minimizing a suitable function of the error. Usually the mean squared error $E\{e^2(n)\}$ is chosen, this criterion has a single global minimum, as long as the system maintains its linearity. This allows for many adaptive approaches that can converge to the global minimum. A lot of these approaches use time or frequency domain variations of LMS (Least Mean Squared) adaptive algorithm. The algorithm is also well known and is used here as a representative approach for linear Acoustic Echo Cancellation. The LMS algorithm uses "steepest decent" to approach the global minimum. The LMS update equation for the filter path estimate can be derived by minimizing the mean squared error and taking the instantaneous gradient estimate between the error e(n) and the input x(n).

$$\tilde{h}(n+1)=\tilde{h}(n)+2\mu e(n)x(n) \qquad (6)$$

Here, $\mu$ is a learning rate factor. It can be shown to be constrained by the maximum eigen-value of the input auto-correlation and overall convergence of the algorithm is constrained by the eigen-value spread. The LMS algorithm is sensitive to the power of the input. This dependency is usually removed by normalizing the update component with the input power $x(n)^T x(n)$.

The above equations assume that the time variations in the LEMS system are slow enough that the adaptive algorithms can converge to the right solutions faster than the acoustic path changes. This is typically true as long as the reference echo signal is not modified beyond the point where it is tapped for the adaptive algorithm.

The present approaches linearize the acoustic echo problem, by accounting for the non-linearities of the speaker response. Hence, well-behaved low complexity linear AEC algorithms may be used instead of the complex non-linear AEC algorithms with their associated problems.

More specifically, the microphone 108 is used to pick up the echo reference signal. The speaker 106 and the echo reference microphone 108 are configured to have acoustic ports at close proximity (extreme near-field). Such an echo reference microphone can be designed to be sensitive to audio signals in close proximity and attenuate far-field signals very sharply. Exemplary distances separating the two ports could be less than approximately 5 mm. The near-end source is typically at least 5 to more than 25 times that distance, i.e., 25 mm to more than 125 mm. Advantageously and in one aspect, the present approaches linearly capture audio near the port of the speaker 106 while having very low sensitivity to the near end target signal and the ambient audio. This may be achieved in one example by using differential microphones for the microphone 108.

It will be appreciated that generally speaking a microphone with near-field response defined by the acoustic mechanisms described below may be used as a source of the echo reference signal. Such a microphone has a near-field response with a very high roll-off of sensitivity as a function of increasing distance from the microphone. The sharp fall of response with distance permits the use of the microphone to accurately capture the output of the speaker while attenuating near-end speech to extremely low levels.

Figure 2:
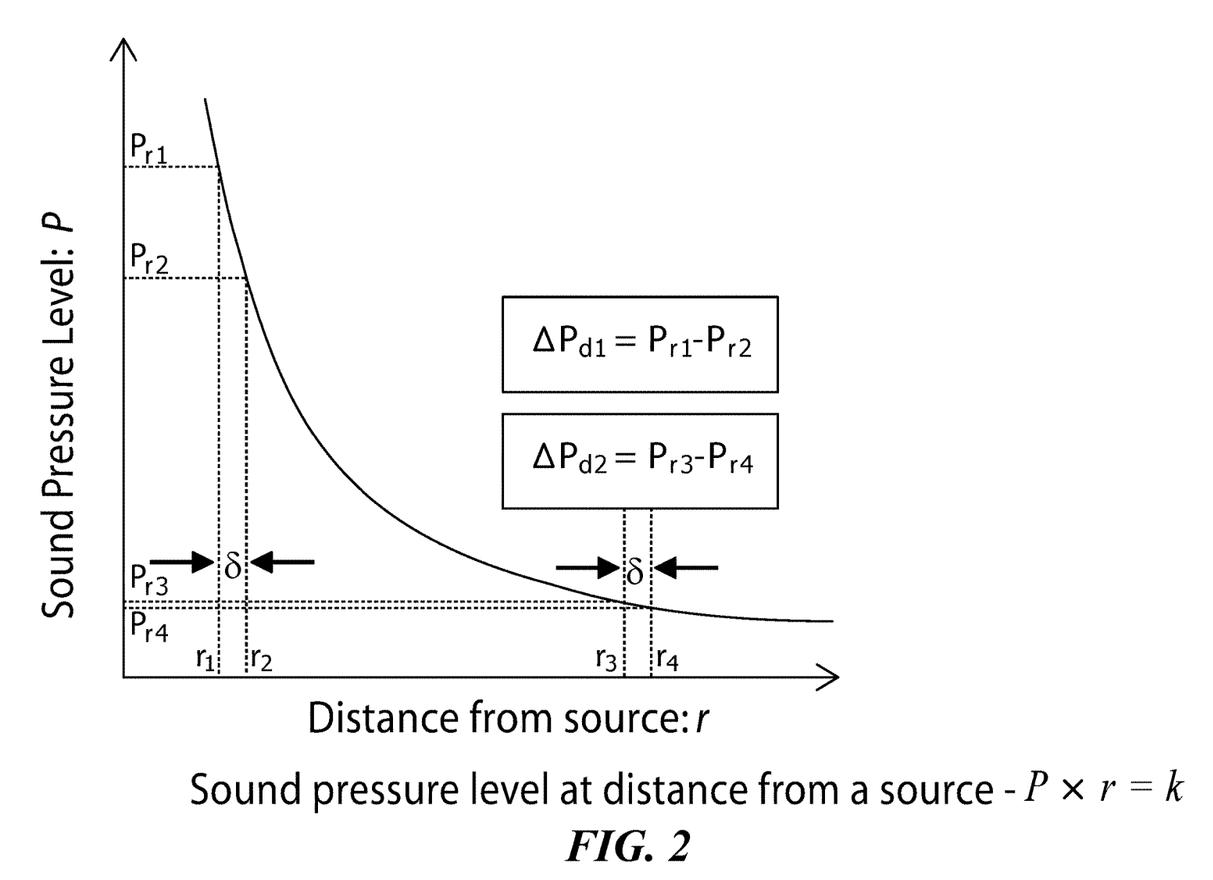
FIG. 2 comprises a graph of sound pressure levels at distances from a source according to various embodiments of the present invention.

Sound pressure level falls with the inverse of the distance as shown in FIG. 2. This is represented by the relationship, $P \times r = k$, where r is the distance from the source and P is the sound pressure level at the source and k is a constant. If the pressure level is converted to dB, then:

$$20 \log_{10}|P(r)|=20 \log_{10}k - 20 \log_{10}r \qquad (7)$$

As shown in FIG. 2, the pressure at a distance $P_{ri}$ at a distance $r_i$; i=1,2,3,4, is given by $k/r_i$. The difference in pressure at a constant distances apart can be represented by $$\Delta P_{d1} = P_{r1} - P_{r2} = \frac{k(r_2 - r_1)}{r_1 r_2} = \frac{k\delta}{r_1 r_2}$$

If $\delta \ll r_1$, then $r_1 r_2 \approx r_1^2$ and $r_3 r_4 \approx r_3^2$, thus $$\Delta P_{d1} \approx \frac{k\delta}{r_1^2}.$$

The actual pressure level can be significantly higher that the differential pressure near the source and could potentially overload an omnidirectional microphone, however the differential pressure is smaller and microphone diaphragm and circuitry is easily designed to avoid overload. Moreover, the effect of this inverse dependence of the differential pressure as function of $r^2$ implies that at a farther distance from the sound source, the differential pressure is significantly smaller than the actual pressure level. This is shown in FIG. 2. If the differential pressure is converted to dB, then:

$$20 \log_{10}|P_d|=20 \log_{10}k\delta - 40 \log_{10}r = 20 \log_{10}k + 20 \log_{10}\delta - 40 \log_{10}r \qquad (8)$$

Figure 3:
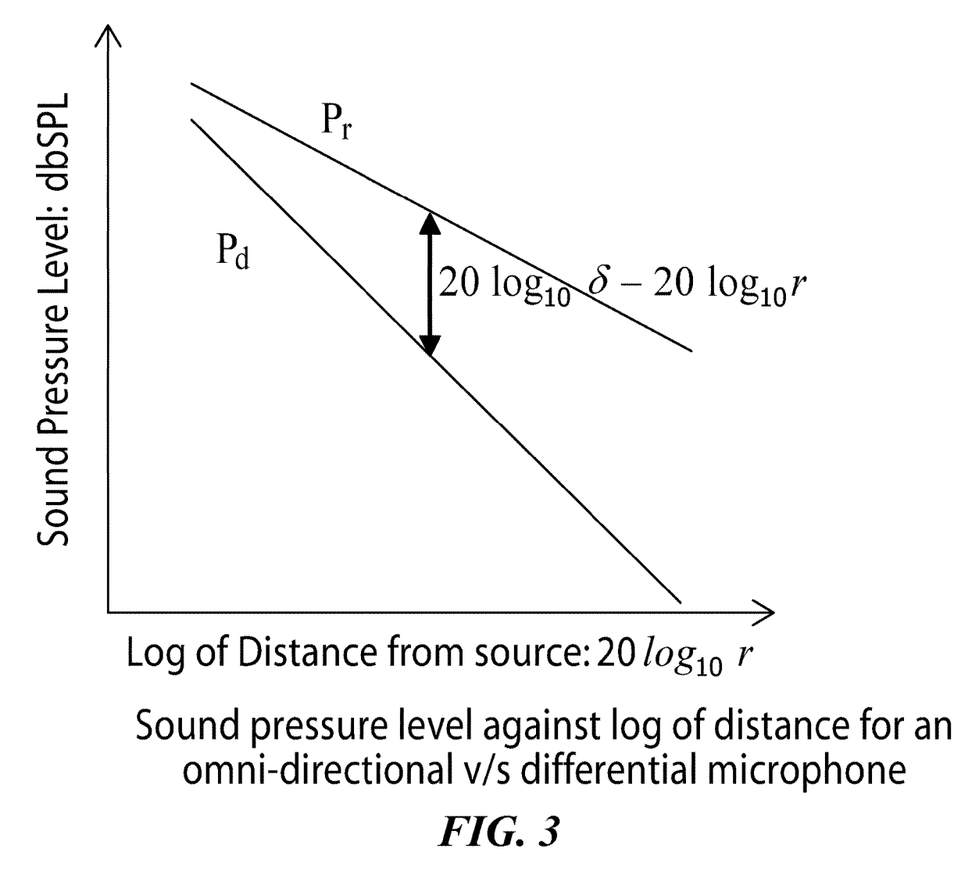
FIG. 3 comprises a graph of sound pressure levels versus the log of the distance for an omni-directional versus differential microphone according to various embodiments of the present invention.

FIG. 3 shows the difference is sound pressure level in dB between an omni-directional microphone and a differential microphone (e.g., those that may be used for the microphone 108) when plotted against the distance on a logarithmic scale. The plot shows the fall of in sensitivity of a differential microphone compared to an omni-directional microphone.

Using approaches having differential microphone pickup (i.e., making the microphone 108 a differential microphone), a clean and linear pickup of a speaker signal in close proximity to the speaker port is obtained. However, the user's voice in a speaker phone configuration is at considerably more remote position and would fall off at the faster rate ($20 \log_{10}\delta - 20 \log_{10}r$) shown in FIG. 3. Here, the first term is a constant and the second term indicates that the differential microphone sensitivity reduces significantly faster than that of an omnidirectional microphone, with distance from the source.

Such a configuration is relatively insensitive to the near-end signals such as the user's voice and near-end ambient noise and provides a linear echo reference signal for acoustic echo cancellation. Thus, a differential microphone in one aspect is used for the echo reference microphone 108.

There are various configurations for differential microphones that could be used for the microphone 108. A few of these examples are now described.

Figure 4:
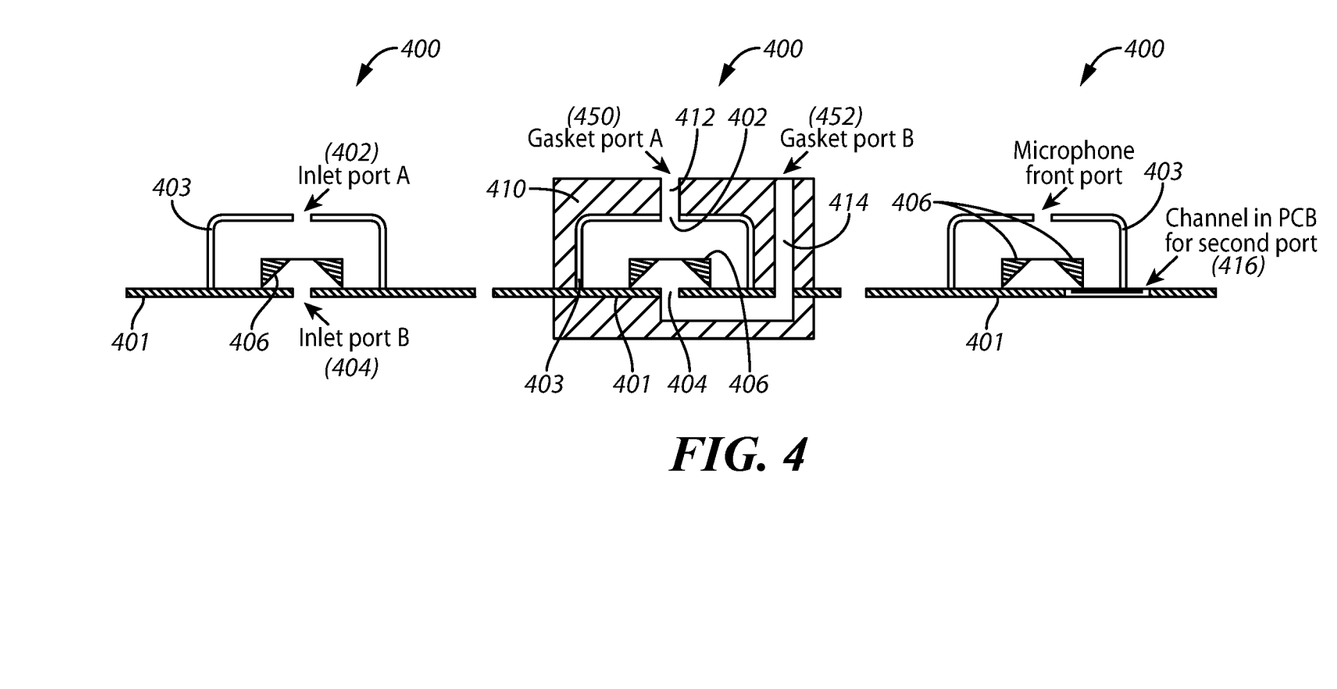
FIG. 4 comprises a block diagram of one example of a differential microphone according to various embodiments of the present invention.

Referring now to FIG. 4, one example of a microphone 400 is described. The microphone 400 is a dual port microphone that operates as a near-field differential microphone. A cover 403 is disposed on a substrate or base 401, and has a first port 402 and a second port 404 extending there through. A MEMS device 406 receives sound energy form the ports and converts the sound energy into electrical signal. In one example, a gasket 410 surrounds the microphone 400. The gasket may have tunnels 412 and 414 leading to the ports 402 and 404. Additionally, a channel 416 may be provided through the substrate to the port 404. The gasket 410 includes ports 450 and 452 that communicate with tunnels 412 and 414.

It will be appreciated that the MEMS devices described herein include a diaphragm and back plate that are charged. Sound pressure moves the diaphragm and the movement creates a differential voltage or current with respect to the back plate. The differential voltage or current is representative of the received sound energy.

Figure 5:
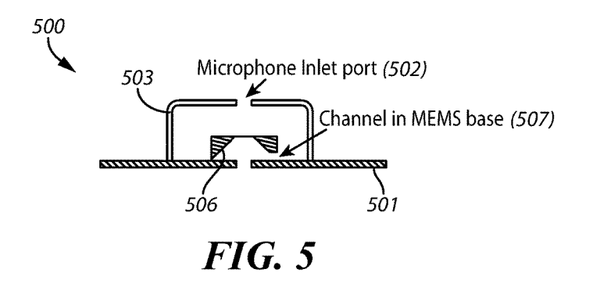
FIG. 5 comprises a block diagram of another example of a differential microphone according to various embodiments of the present invention.

Referring now to FIG. 5, another example of a microphone 500 is described. A cover 503 is disposed on a substrate or base 501, and has a port 502 extends there through. A channel 507 in the base 503 allows communication between the volume beneath the MEMS device 506 and the volume between the cover 503 and the MEMS device 506. A MEMS device 506 receives sound energy form the port 502 and converts the sound energy into electrical signal. In the example of FIG. 5, a single port exposes both side of the diaphragm inside the MEMS device 506. This configuration is reusable for faithfully capturing the echo reference signal.

Figure 6:
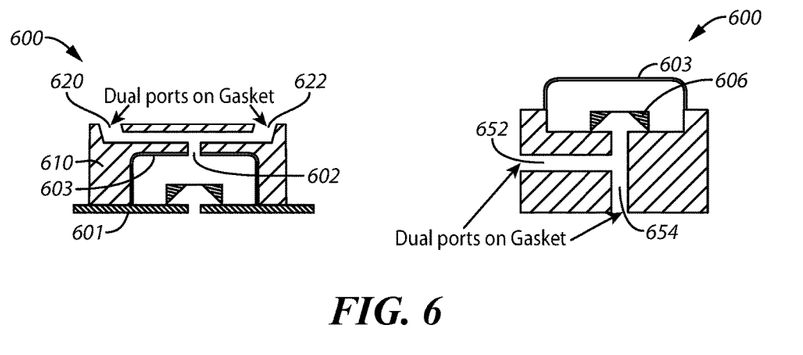
FIG. 6 comprises a block diagram of another example of a differential microphone according to various embodiments of the present invention.

Referring now to FIG. 6, another example of a microphone 600 is described. A cover 603 is disposed on a substrate or base 601, and has a port 602 extends there through. A MEMS device 606 receives sound energy form the port 602 and converts the sound energy into electrical signal. In one example, a gasket 610 surrounds the microphone 600 and has dual ports 620 and 622, which communicate through a channel 624 to the port 602 on the cover 603. In another example, the gasket 610 has tunnels 652 and 654 leading to the port 602 when the port 602 is disposed underneath the MEMS device 606 (and there is not base or substrate). In both examples shown in FIG. 6, a gasket with two acoustic port is connected to the one port of an omnidirectional microphone. The pressure at the microphone port for such a gasket is the differential pressure at the two ports of the gasket.

Figure 7:
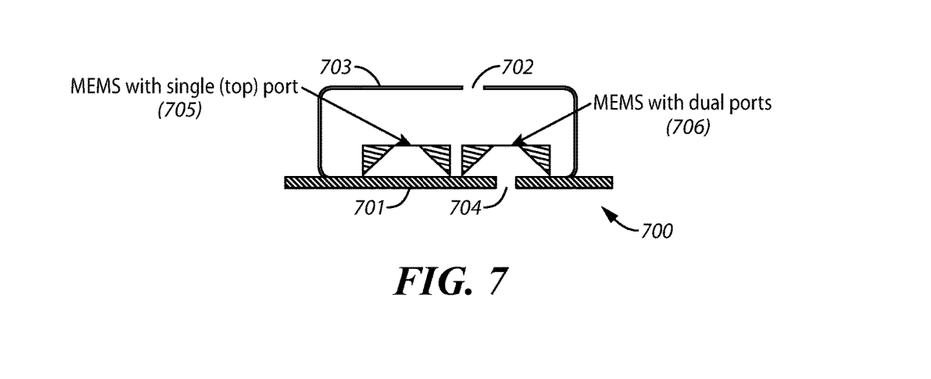
FIG. 7 comprises a block diagram of another example of a differential microphone according to various embodiments of the present invention.

Referring now to FIG. 7, another example of a microphone 700 is described. The microphone 700 includes a first MEMS device 705 and a second MEMS device 706 with a cover 703 disposed on a substrate or base 701. A first port 702 extends through the cover 703 and a second port 704 extends through the base 701. This configuration operates a single port MEMS and may be used for normal voice capture and another MEMS acts as a dual port noise cancelling structure used primarily to provide the echo cancellation reference signal. This configuration may also allow for better ambient noise cancellation for the transmit signal, by combining the signals of the single and dual port MEMS.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, comprising:
   receiving a far end signal from a far end user and broadcasting the far end signal at a loudspeaker;
   determining a signal for use in estimating an echo transfer function, the signal selected from between: the far end signal and an echo reference signal received from a near field microphone disposed in close proximity to the speaker, the determining the signal based at least in part on a comparison between the far end signal and the echo reference signal, the near field microphone sensing the far end signal that is broadcast from the speaker;
   determining an echo transfer function based at least in part upon the selected signal, the echo transfer function representing characteristics of an acoustic path between the loudspeaker and a far field microphone that is disposed at a greater distance from the speaker than the near field microphone;
   determining an estimated echo based at least in part upon the echo transfer function;
   subtracting the estimated echo from a signal received from the far field microphone, the subtracting effective to cancel an echo present in the signal received from the far end microphone.

2. The method of claim 1, wherein the near field microphone is a differential microphone.

3. The method of claim 2, wherein a differential pressure level due to a speaker output of the far end signal does not overload the differential microphone despite the differential microphone being proximate to the speaker.

4. The method of claim 3, wherein a signal picked up at the differential microphone is the speaker output including speaker non-linearity effects and has insignificant energy due to a near-end speech signal and ambient noise, and wherein the echo transfer function estimation process is a linear process.

5. The method of claim 2, wherein a differential pressure level due to a near-end speech signal and ambient noise is insignificant at the differential microphone due to distances of a source of the near-end speech signal and a source of the ambient noise from the differential microphone.

6. The method of claim 5, wherein a signal picked up at the differential microphone is a speaker output signal including speaker non-linearity effects and has insignificant energy due to a near-end speech signal and ambient noise, and wherein the echo transfer function is linear.

7. The method of claim 6, whereby the echo transfer estimate from the linear echo transfer function estimation is used to estimate a non-linear echo path and subtract the non-linear echo path from the signal received from the far-field microphone.

8. The method of claim 1, wherein the far end signal is amplified by a power amplifier.

9. The method of claim 1, wherein the speaker and near field microphone are disposed so as to be approximately within 5 mm of each other.

10. The method of claim 1, wherein the near field microphone, the far field microphone, and the speaker are disposed in a single platform.

11. The method of claim 10, wherein the single platform is in a cellular phone, laptop, tablet, home automation device, or other near-end speech communication device or device capable of audio playback and responsive to speech input.

12. The method of claim 1, wherein the near field microphone and the speaker are disposed in a single first platform and the far-field microphone is disposed in another a second platform within the same acoustic environment.

13. An apparatus, comprising,
   a near field microphone for receiving sound from a speaker and producing an echo reference signal;
   a far field microphone that receives sound from the speaker;
   wherein the near field microphone and speaker are in close proximity;
   an echo reference control module configured to adaptively and determine an echo estimation signal, the echo estimation signal being selected from between: an echo reference signal received from the near field microphone and a far end signal from a far end user, the determination of the echo estimation signal based at least in part on a comparison between the echo reference signal and the far end signal;

an adaptation module that is configured to determine an echo transfer function based at least in part upon the selected echo estimation signal, and the adaptation module being further configured to determine an estimated echo based at least in part upon the echo transfer function;

a summer that subtracts the estimated echo from a signal produced by the far field microphone to produce an echo canceled signal.

14. The apparatus of claim 13, wherein the near field microphone is a differential microphone.

15. The apparatus of claim 14, wherein a differential pressure level due to a speaker output of the far end signal does not overload the differential microphone despite the differential microphone being proximate to the speaker.

16. The apparatus of claim 15, wherein a signal picked up the differential microphone is the speaker output including speaker non-linearity effects and has insignificant energy due to a near-end speech signal and ambient noise, and wherein the echo transfer function estimation process is a linear process.

17. The apparatus of claim 14, wherein a differential pressure level due to a near-end speech signal and ambient noise is insignificant at the differential microphone due to distances of a source of the near-end speech signal and a source of the ambient noise from the differential microphone.

18. The apparatus of claim 17, wherein a signal picked up at the differential microphone is a speaker output signal including speaker non-linearity effects and has insignificant energy due to a near-end speech signal and ambient noise, and wherein the echo transfer function is linear.

19. The apparatus of claim 18, whereby the echo transfer estimate from the linear echo transfer function estimation is used to estimate a non-linear echo path and subtract the non-linear echo path from the signal received from the far-field microphone.

20. The apparatus of claim 13, wherein the far end signal is amplified by a power amplifier.

21. The apparatus of claim 13, wherein the speaker and the near field microphone are disposed so as to be approximately within 5 mm of each other.

22. The apparatus of claim 13, wherein the near field microphone, the far field microphone, and the speaker are disposed in a single platform.

23. The apparatus of claim 22, wherein the single platform is in a cellular phone, laptop, tablet, home automation device, or other near-end speech communication device or device capable of audio playback and responsive to speech input.

24. The apparatus of claim 13, wherein the near field microphone and the speaker are disposed in a first platform and the far-field microphone is disposed in a second platform within the same acoustic environment.

* * * * *